United States Patent [19]

Lee, Jr.

[11] 4,108,925
[45] Aug. 22, 1978

[54] THERMOPLASTIC MOLDING COMPOSITIONS OF RUBBER MODIFIED COPOLYMERS OF A VINYL AROMATIC COMPOUND AND AN α,β-UNSATURATED CYCLIC ANHYDRIDE

[75] Inventor: Gim Fun Lee, Jr., Albany, N.Y.

[73] Assignee: General Electric Company, Pittsfield, Mass.

[21] Appl. No.: 633,418

[22] Filed: Nov. 19, 1975

Related U.S. Application Data

[62] Division of Ser. No. 527,140, Nov. 25, 1974.

[51] Int. Cl.$^2$ ............... C08L 51/04; C08L 51/06; C08L 51/08
[52] U.S. Cl. ............... 260/876 R; 260/42.17; 260/42.18; 260/42.22; 260/42.47; 260/42.52; 260/880 R; 264/328
[58] Field of Search .... 260/876 R, 880 R (U.S. only)

[56] References Cited

U.S. PATENT DOCUMENTS

| | | | |
|---|---|---|---|
| 2,769,804 | 11/1956 | Hanson | 526/329.2 X |
| 2,857,360 | 10/1958 | Feuer | 260/880 X |
| 2,943,074 | 6/1960 | Feuer | 260/880 |
| 2,971,939 | 2/1961 | Baer | 260/886 |
| 3,336,267 | 8/1967 | Zimmerman et al. | 526/87 X |
| 3,641,212 | 2/1972 | Narayana et al. | 260/876 B X |
| 3,689,596 | 9/1972 | Narayana et al. | 260/876 B |
| 3,787,532 | 1/1974 | Carmelite et al. | 260/876 R |
| 3,792,123 | 2/1974 | Abolins et al. | 260/876 R |
| 3,833,687 | 9/1974 | Lee, Jr. | 260/876 R |
| 3,833,688 | 9/1974 | Abolins et al. | 260/876 R |
| 3,981,841 | 9/1976 | Abolins et al. | 260/876 R |
| 3,983,090 | 9/1976 | Abolins et al. | 260/876 R |
| 4,057,599 | 11/1977 | Cooper et al. | 260/876 B X |

FOREIGN PATENT DOCUMENTS 2,154,030 4/1973 France.

Primary Examiner—Howard E. Schain
Attorney, Agent, or Firm—Morgan, Finnegan, Pine, Foley and Lee

[57] ABSTRACT

Novel thermoplastic molding compositions are disclosed which are based on a rubber modified copolymer of a vinyl aromatic compound and an α,β-unsaturated cyclic anhydride, and an acrylic graft polymerization copolymer, with or without a polyphenylene ether resin.

8 Claims, No Drawings

THERMOPLASTIC MOLDING COMPOSITIONS OF RUBBER MODIFIED COPOLYMERS OF A VINYL AROMATIC COMPOUND AND AN α,β-UNSATURATED CYCLIC ANHYDRIDE

This is a division of application Ser. No. 527,140 filed Nov. 25, 1974.

This invention provides thermoplastic molding compositions that are based on a rubber modified copolymer of a vinyl aromatic compound an an α,β-unsaturated cyclic anhydride and an acrylic graft polymerization copolymer. These compositions may include a polyphenylene ether resin as a third component.

BACKGROUND OF THE INVENTION

The term "rubber modified copolymer of a vinyl aromatic compound and an α,β-unsaturated cyclic anhydride" is used to generically designate a class of materials that are exemplified by rubber modified styrene-maleic anhydride. These materials are well known and are commerically available as a thermoplastic molding composition. The impact strengths of this material has been relatively low and therefore it has been desirable to upgrade the physical properties of this material. Applicant has found that compositions of a rubber modified copolymer of a vinyl aromatic compound and an acrylic graft polymerization copolymer have increased Izod impact strength and good heat distortion temperatures. Also, the addition of a poly(2,6-dimethyl-1,4-phenylene) resin to this composition will further enhance the impact strength and will also provide a composition with a high distortion temperature.

Accordingly, it is a primary object of the present invention to provide compositions of a rubber modified copolymer of a vinyl aromatic compound an an α,β-unsaturated copolymer having improved impact strength.

It is also an object of the present invention to provide compositions of a rubber modified copolymer of a vinyl aromatic compound an an α,β-unsaturated copolymer having improved heat distortion temperature.

DESCRIPTION OF THE INVENTION

According to the present invention there are provided compositions that are useful for the manufacture of thermoplastic molded articles. These thermoplastic molding compositions comprise:

(a) from 40-95 parts by weight of a rubber modified copolymer of a vinyl aromatic compound and an α,β-unsaturated anhydride;

(b) from 5-60 parts by weight of an emulsion graft polymerization product of an acrylic monomer, alone or in admixture, with a styrene monomer on a rubbery diene homopolymer or styrenediene copolymer backbone; and (c) from 0-50 parts by weight of a polyphenylene ether resin.

The preferred compositions of the invention will contain from 5-50 parts by weight of a polyphenylene ether resin. The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes for preparing polyphenylene ether resins, including graft copolymers of polyphenylene ethers with styrene type compounds, are found in Fox, U.S. Pat. No. 3,356,761; Sumitomo, U.K. Pat. No. 1,291,609; Bussink et al, U.S. Pat. No. 3,337,499; Blanchard et al, U.S. Pat. No. 3,219,626; Laakso et al, U.S. Pat. No. 3,342,892; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. Cizek, U.S. U.S. Pat. No. 3,383,435 discloses polyphenylene ether-styrene resin compositions. All of the above-mentioned disclosures are incorporated herein by reference.

The useful polyphenylene ether resins include those of the formula:

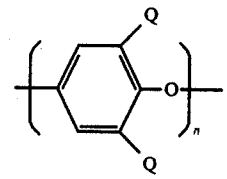

wherein the oxygen ether atom of one unit is connected to the benzene nucleus of the next adjoining unit, in is the degree of polymerization and is an integer of at least 50, and each Q is a monovalent substituent selected from the group consisting of hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and phenyl nucleus, said radicals being free of a tertiary alphacarbon atom. The preparation of polyphenylene ether resins corresponding to the above formula is described in the above-mentioned patents of Hay and Stamatoff Especially preferred polyphenylene ether resins for purposes of the present invention are those having alkyl substitution in the two positions ortho to the oxygen ether atom — i.e., where each Q is alkyl, most preferably, having from 1 to 4 carbon atoms. The most preferred polyphenylene ether resin for purposes of the present invention is poly (2,6-dimethyl-1,4-phenylene) ether (each Q is methyl).

The rubber modified copolymers of the vinyl aromatic compounds and the α,β-unsaturated cyclic anhydride are well known and are described in the literature. The vinyl aromatic component may be derived from compounds of the formula:

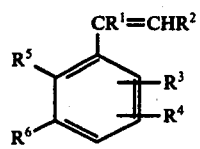

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substituent that has a tertiary carbon atom. Styrene is the preferred vinyl aromatic compound.

The α,β-unsaturated anhydrides may be represented by the formula:

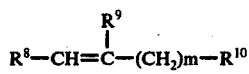

wherein $R^8$ and $R^9$ taken together represent a —COOOC-linkage and $R^{10}$ is hydrogen, vinyl, alkyl or alkenyl of 1-12 carbon atoms. The α,β-unsaturated cyclic anhydrides include maleic anhydride, citraconic anhydride, itaconic anhydride, aconitic anhydride and the like. The preferred α,β-unsaturated cyclic anhydride is maleic anhydride.

The rubber employed in preparing the rubber modified copolymers of a vinyl aromatic compound and an α,β-unsaturated cyclic anhydride may be a polybutadiene rubber, butyl rubber, styrene-butadiene rubber, acrylonitrile rubber, ethylene-propylene copolymers, natural rubber, EPDM rubbers and the like.

These polymers may comprise 40 to 1 parts by weight of the α,β-unsaturated cyclic anhydride, from 60 to 99 parts by weight of a vinyl aromatic compound and from 2 to 25 parts by weight of rubber. The preferred polymers will contain about 25-5 parts by weight of the α,β-unsaturated cyclic anhydride, 75-95 parts by weight of the vinyl aromatic compound and 10 parts by weight of rubber. The preparation of similar copolymers is described in U.S. Pat. Nos. 2,971,939; 3,336,267 and 2,769,804 which are incorporated by reference. The rubber modified copolymers are described in Netherlands Pat. No. 7,212,714 which is also incorporated by reference.

The graft polymerization product of an acrylic monomer and a diene rubber preferably comprises (1) from about 20-80% by weight of a backbone polymer of the units of butadiene or butadiene and styrene, wherein the butadiene units are present in quantities of at least 40% by weight of the backbone polymer, (2) 80-20% by weight of an acrylic monomer graft polymerized to (1); said acrylic monomer units being selected from the group consisting of lower alkyl methacrylates, alicyclic methacrylates and alkyl acrylates, and (3) 0 to 60% by weight of a styrene monomer graft polymerized to (1) or (2); sequentially or simultaneously with the polymerization of (2).

The graft polymerization product of an acrylic monomer alone or with styrene monomer and the rubbery diene polymer or copolymer may be prepared by known techniques, typically by emulsion polymerization. They may be formed from a styrenebutadiene copolymer latex and a monomeric material such as methyl methacrylate alone or with another compound having a single vinylidene group copolymerizable therewith, e.g., styrene. For example, in the preparation of a representative material, 85–65 parts by weight of monomeric methyl methacrylate or monomeric methyl methacrylate to the extent of at least 55% and preferably as much as 75% by weight in admixture with another monomer which copolymerizes therewith, such as ethyl acrylate, acrylonitrile, vinylidene chloride, styrene, and similar unsaturated compounds containing a single vinylidene group, is added to 15–35 parts by weight of solids in a styrene-butadiene copolymer latex. The copolymer solids in the latex comprise about 10–50% by weight of styrene and about 90–50% by weight of butadiene and the molecular weight thereof is within the range of about 25,000 to 1,500,000. The copolymer latex of solids in water contains a dispersing agent such as sodium oleate or the like to maintain the copolymer in emulsion. Interpolymerization of the monomer or monomeric mixture with the copolymer solids emulsified in water is brought about in the presence of a free-radical generating catalyst and a polymerization regulator which serves as a chain transfer agent, at a temperature of the order of 15° C to 80° C. Coagulation of the interpolymerized product is then effected with a calcium chloride solution, for instance, whereupon it is filtered, washed and dried. Other graft copolymers and differing from the above only in the ratio of monomeric material solely or preponderantly of methyl methacrylate to the butadiene-styrene copolymer latex in the presence of which it is polymerized extends from 85–25 parts by weight of the former to 15–75 parts by weight of the latter. These materials may extend in physical properties from relatively rigid compositions to rubbery compositions. A preferred commercially available material is Acryloid KM 611 which is sold by Rohm & Haas. Also, U.S. Pat. Nos. 2,943,074 and 2,857,360, which are incorporated by reference, contain additional information as to the preparation of these materials. A preferred material is described in U.S. Pat. No. 2,943,074, column 4, preparation "D" and converted to emulsified polymer "B" as described therein.

The compositions of the invention may also include reinforcing fillers, such as aluminum, iron or nickel, and the like, and non-metals, such as carbon filaments silicates, such as acicular calcium silicate, asbestos, titanium dioxide, potassium titanate and titanate whiskers, glass flakes and fibers. It is also to be understood that, unless the filler adds to the strength and stiffness of the composition, it is only a filler and not a reinforcing filler, as contemplated herein.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively sode free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70-80% by weight of glass. These concentrates can then be custom blended with blends of resins that are not glass reinforced to provide any desired glass content of a lower value.

The length of glass filaments and whether or nor they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ to about 1 inch long, preferably less than ¼ inch long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (⅛ inch).

It is a preferred feature of this invention also to provide flame retardant thermoplastic compositions of rubber modified vinyl aromatic $\alpha,\beta$-unsaturated cyclic anhydrides as defined above by modifying said compositions to include a flame-retardant additive in a minor proportion but in an amount at least sufficient to render the composition non-burning or self-extinguishing.

Particular flame retardants which may be used are well known and are described in the literature.

The compositions may be prepared by tumbling the components, extruding the mixed powders into a continuous strand, chopping the strands into pellets and thereafter molding the pell ets into the desired shape. These techniques are well known to those skilled in this art and are not a critical feature of the invention.

DESCRIPTION OF THE PREFERRED EMBODIMENTS

The present invention is further illustrated in the following examples which are set forth as further descriptions of the invention, but are not to be construed as limiting the invention thereto.

EXAMPLE I

A composition of 85 parts by weight of a rubber modified styrene-maleic anhydride copolymer (Dylark 240, Koppers Chemical) and 15 parts by weight of an emulsion graft polymerization product of an acrylic monomer on a rubbery backbone (Acryloid XM 611, Rohm & Haas). The composition was melt blended and molded into test bars. The test bars were subjected to testing and were found to have the following physical properties:

|  | Ex I | Control* |
| --- | --- | --- |
| Tensile Yield (psi) | 7000 | 8900 |
| Elongation (%) | 31 | 19 |
| Izod Impact (ft.lb/in.n.) | 2.4 | 1.6 |
| Gardner Imp. (in. lb) | 10 | 6 |
| HDT (° F) | 210 | 215 |

*Dylark 240

EXAMPLE II

A composition of 75 parts by weight of a rubber modified styrene-maleic anhydride copolymer (Dylark 240, Koppers Chemical), 15 parts by weight of an emulsion graft polymerization product of an acrylic monomer on a rubbery backbone (Acryloid KM 611, Rohm and Haas), and 15 parts by weight of poly(2,6-dimethyl-1,4-phenylene) ethers having an IV. in $CHCl_3$ of about 0.5 at 25° C (PPO, General Electric Co.) were melt blended and molded into test bars. The test bars were subjected to testing and the following physical data was obtained:

| Tensile Yield (psi) | 7400 |
| --- | --- |
| Elongation (%) | 24 |
| Izod Impact (ft. lb/in.n.) | 2.9 |
| Gardner Imp (in. lb.) | 80 |
| HDT (° F) | 227 |

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. A thermoplastic molding composition which comprises:
   (a) from 40–95 parts by weight of a rubber modified copolymer of a vinyl aromatic compound and an $\alpha,\beta$-unsaturated anhydride; and
   (b) from 5–60 parts by weight of an emulsion graft polymerization pproduct of an acrlic monomer alone or in admixture with a styrene monomer on a rubbery diene homopolymer or styrene-diene copolymer backbone.

2. A composition as defined in claim 1 wherein the copolymer of a vinyl aromatic compound and an unsaturated cyclic anhydride is based on a vinyl aromatic compound of the formula:

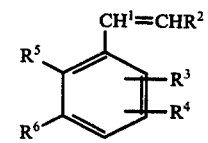

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups from 1 to 6 carbon atoms or $R^5$ and $R^6$ may be concated together with hydrocarbyl groups to form a naphthyl group, said compounds being free of any substituent that has a tertiary carbon atom.

3. A composition as defined in claim 1 wherein said rubber modified copolymer of a vinyl aromatic compound and a α,β-unsaturated cyclic anhydride comprises from 40 to 1 parts by weight of the α,β-unsaturated cyclic anhydride, from 60 to 99 parts by weight of a vinyl aromatic compound and 2 to 25 parts by weight of rubber.

4. A composition as defined in claim 1 wherein the emulsion graft polymerization product comprises (1) from 20-80% by weight of a backbone polymer of the units of butadiene or butadiene and styrene, wherein the butadiene units are present in quantities of at least 40% by weight of the backbone polymer, (2) 80-20% by weight of an acrylic monomer graft polymerized to (1); said acrylic monomer units being selected from the group consisting of lower alkyl methacrylates, aliclic methacrylates and alkyl acrylates, and (3) 0 to 60% by weight of a styrene monomer graft polymerized to (1) or (2) sequentially or simultaneously with the polymerization of (2).

5. A thermoplastic molding composition which consists essentially of:

(a) from 40-95 parts by weight of a rubber modified copolymer of a vinyl aromatic compound and an α,β-unsaturated anhydride; and (b) from 5-60 parts by weight of an emulsion graft polymerization product of an acrylic monomer alone or in admixture with a styrene monomer on a rubbery diene homopolymer or styrenediene copolymer backbone.

6. A thermoplastic molding composition which comprises (a) from 40-95 parts by weight of a rubber modified copolymer of styrene-maleic anhydride; (b) from 5-60 parts by weight of an emulsion graft polymerization product which comprises (1) from 20-80% by weight of a backbone polymer of the units of butadiene or butadiene-styrene, wherein the butadiene units are present in quantities of at least 40% by weight of the backbone polymer, (2) 80-20% by weight of an acrylic monomer graft polymerized to (1); said acrylic monomer units being selected from the group consisting of lower alkyl methacrylates and alkyl acrylates and (3) 0 to 60% by weight of a styrene monomer graft polymerized to (1) or (2) sequentially or simultaneously with the polymerization of (2).

7. A composition as defined in claim 1 including a reinforcing amount of a reinforcing filler.

8. A composition as defined in claim 1 including a flame retardant amount of a flame retardant agent.

* * * * *

UNITED STATES PATENT AND TRADEMARK OFFICE
CERTIFICATE OF CORRECTION

PATENT NO. : 4,108,925
DATED : August 22, 1978
INVENTOR(S) : Gim Fun Lee, Jr.

It is certified that error appears in the above-identified patent and that said Letters Patent are hereby corrected as shown below:

In Column 2, line 55, after "Stamatoff", insert a period (.)

In Column 4, line 50, after "filaments", insert a comma (,)

In column 5, line 66, "Acryloid XM 611" should be --Acryloid KM 611--.

In Column 5, line 50, "pell ets" should be --pellets--.

UNITED STATES PATENT AND TRADEMARK OFFICE
CERTIFICATE OF CORRECTION

PATENT NO. : 4,108,925
DATED : August 22, 1978
INVENTOR(S) : Gim Fun Lee, Jr.

It is certified that error appears in the above–identified patent and that said Letters Patent are hereby corrected as shown below:

In column 6, line 46, change "pproduct" to --product--.

In column 6, line 46, change "acrlic" to --acrylic--.

In column 6, line 68, change "concated" to --concatenated--.

In column 7, line 21, change "aliclic" to --alicyclic--.

Signed and Sealed this

First Day of May 1979

[SEAL]

Attest:

RUTH C. MASON
Attesting Officer

DONALD W. BANNER
Commissioner of Patents and Trademarks